United States Patent
Hoarty

(10) Patent No.: US 10,360,651 B1
(45) Date of Patent: Jul. 23, 2019

(54) COMPATIBLE ADAPTIVE VIDEO WATERMARKING

(71) Applicant: INSCAPE DATA, INC., Irvine, CA (US)

(72) Inventor: W. Leo Hoarty, Morgan Hill, CA (US)

(73) Assignee: INSCAPE DATA, INC., Irvine, CA (US)

( * ) Notice: Subject to any disclaimer, the term of this patent is extended or adjusted under 35 U.S.C. 154(b) by 0 days.

(21) Appl. No.: 15/704,242

(22) Filed: Sep. 14, 2017

Related U.S. Application Data

(60) Provisional application No. 62/394,390, filed on Sep. 14, 2016.

(51) Int. Cl.
   *G06T 1/00* (2006.01)
(52) U.S. Cl.
   CPC ................... *G06T 1/0028* (2013.01)
(58) Field of Classification Search
   None
   See application file for complete search history.

(56) References Cited

U.S. PATENT DOCUMENTS

| | | | | |
|---|---|---|---|---|
| 6,222,932 B1* | 4/2001 | Rao | ................... | G06T 1/0028 380/54 |
| 7,154,560 B1* | 12/2006 | Chang | ................... | G06T 1/0028 348/598 |
| 7,197,164 B2* | 3/2007 | Levy | ................... | G06T 1/0028 348/463 |
| 8,861,922 B2* | 10/2014 | Zarrabizadeh | .......... | G06T 1/005 386/260 |
| 2005/0069168 A1* | 3/2005 | Zarrabizadeh | ........ | G06T 1/0028 382/100 |
| 2013/0188824 A1* | 7/2013 | Hou | ................... | G06T 1/005 382/100 |
| 2015/0324948 A1* | 11/2015 | Cain | ................... | G06T 1/0092 382/100 |

* cited by examiner

*Primary Examiner* — Nancy Bitar
(74) *Attorney, Agent, or Firm* — Polsinelli LLP

(57) ABSTRACT

An array of a multiplicity of ten-by-ten grids of pixels per video frame is employed to form a watermark mask. Motion of a pixel block is determined by a pseudo-random sequence from a seed value. The resulting invention embeds data as binary bits by shifting one or more color space values of a small patch of pixels.

1 Claim, 21 Drawing Sheets

Adaptive Video Watermark Embedding Process

HDTV display area showing 32 pixel patch locations

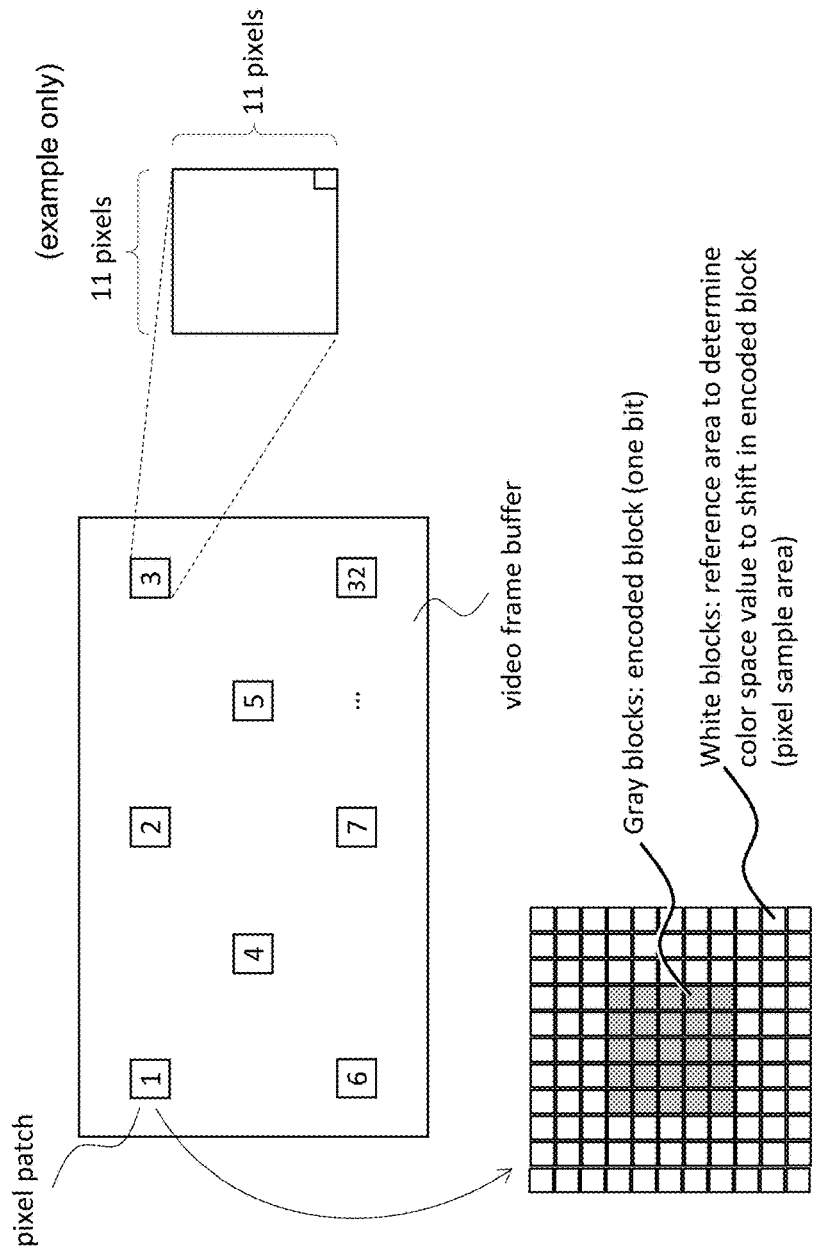
Fig 1. HDTV display area showing 32 pixel patch locations

Adaptive Video Watermark (AVW) Embedding Process

1. Video segment to be watermarked is analyzed by individual pixel patch locations
2. Watermark code work fits one video frame typically requiring from 8 to 32 bits
3. Technique embeds one bit of data into pixel blocks with 2b area carrying data of 1 bit
4. Assuming 11x11 pixel block, AVW reads average value of areas around 2b
   1. which are: 1a, 1b, 1c, 2a, 2c, 3a, 3b, 3c
5. Applies rules of human visual perception per sensitivity to hue, saturation and lightness (HSL) changes
6. 2b is altered in one or more of HSL axis to embed a binary one or no change for zero
   1. relative to surrounding pixels

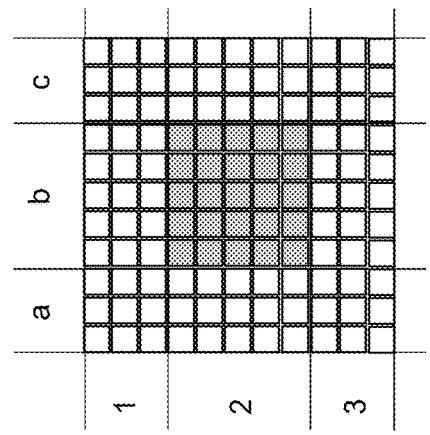

Fig 2. Pixel patch area of 11x11 pixels

Adaptive Video Watermark (AVW) - Definitions
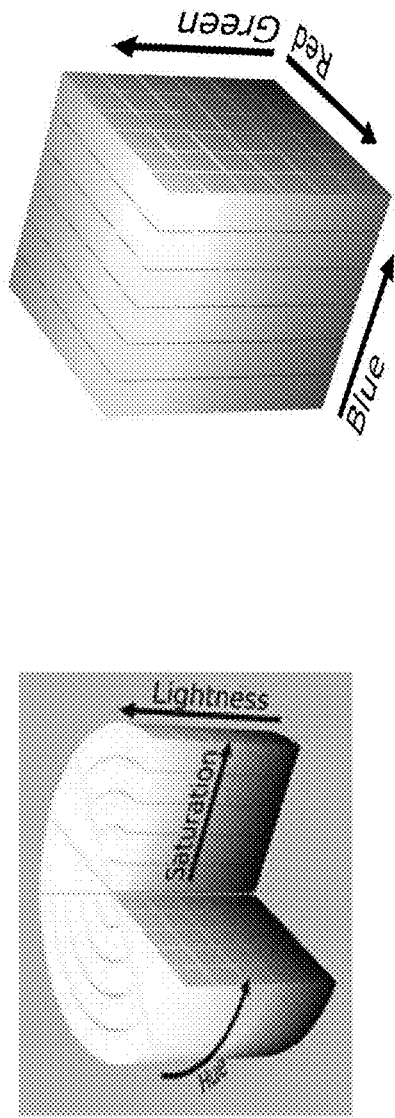
The mathematical relationship between RGB and HSL color space:
$L = R+G+B / 3$
$S = 1 - (3 / (R+G+B)) * \min(R,G,B)$
$H = \cos^{-1}((0.5(R-G))+(R-B)) / ((((R-G)2)+((R-B)(G-B)))^{0.5})$
Fig 3. Color space graphs of HSL and RGB color space

Adaptive Video Watermark (AVW) Embedding Process
1. Data carrying grid moves each frame (in which it is applied) in pseudo-random steps to further conceal encoding from human visual perception
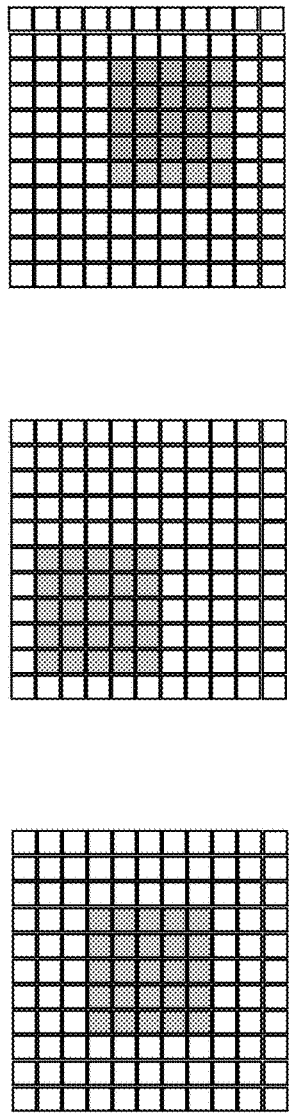
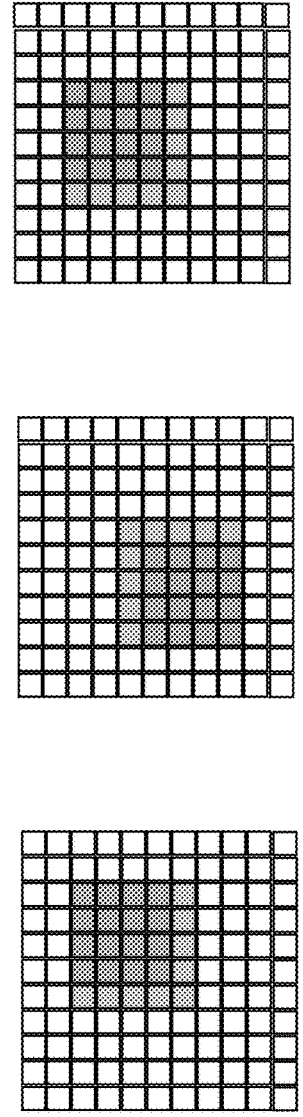
Fig 4. Data block pseudo-random motion around pixel patch

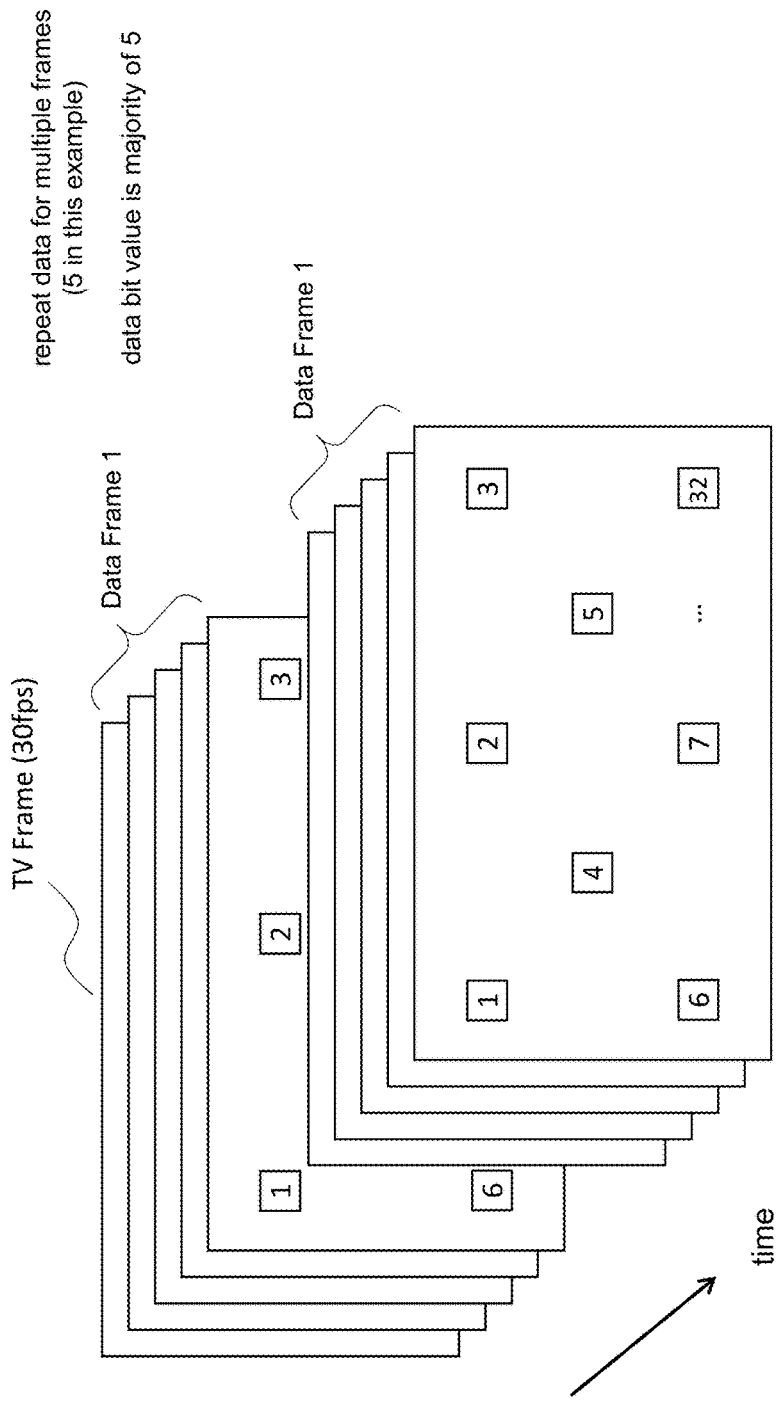
Fig 5. Data repetition by frame grouping

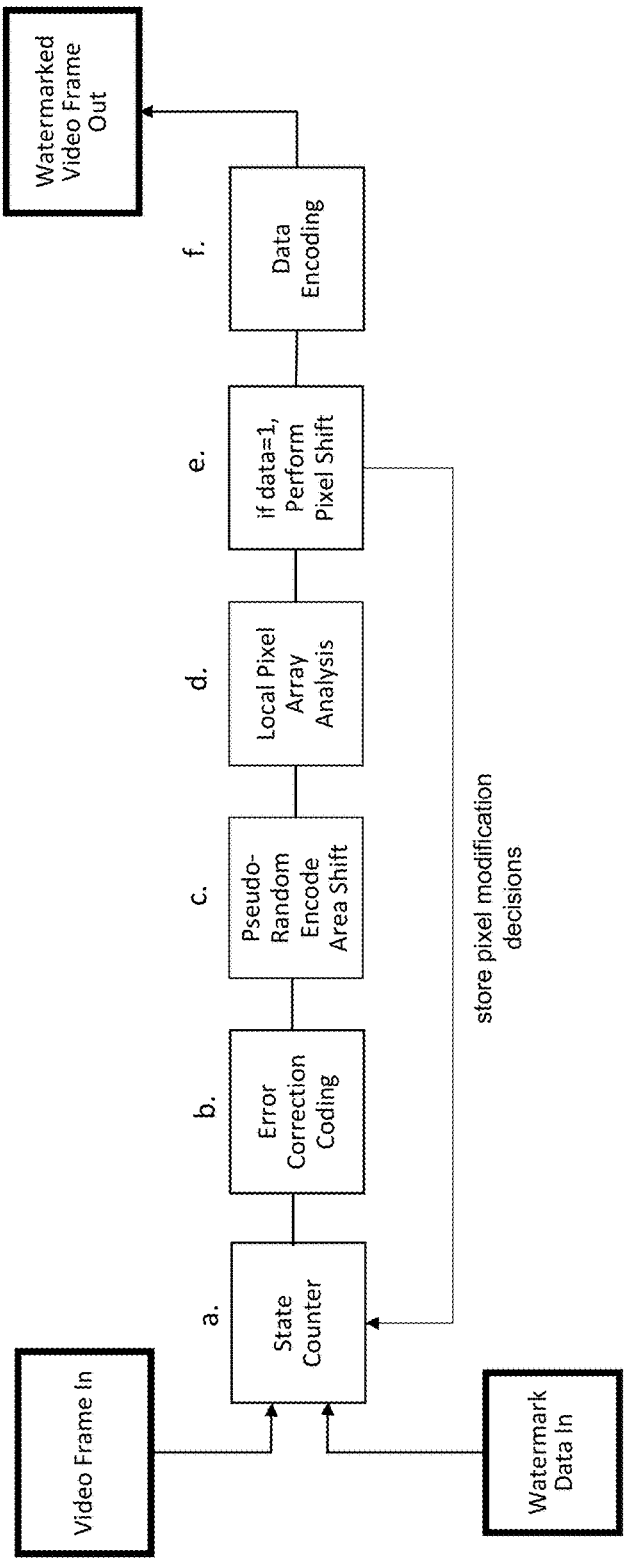
Fig 6. Encoding flow diagram

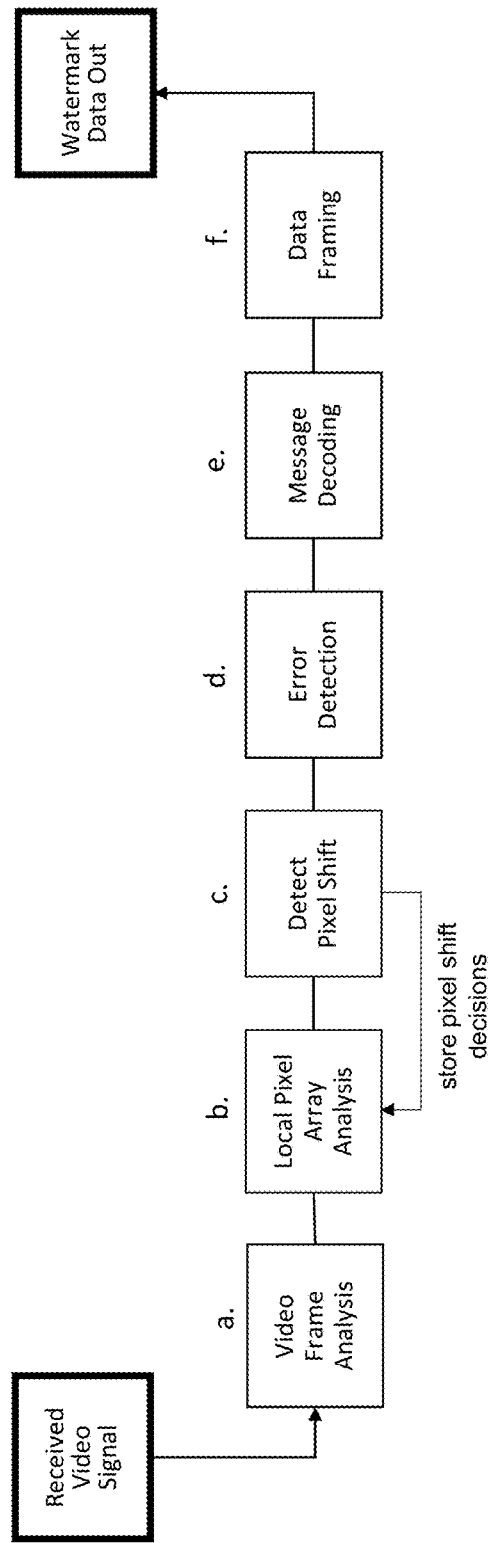
Fig 7. Dencoding flow diagram

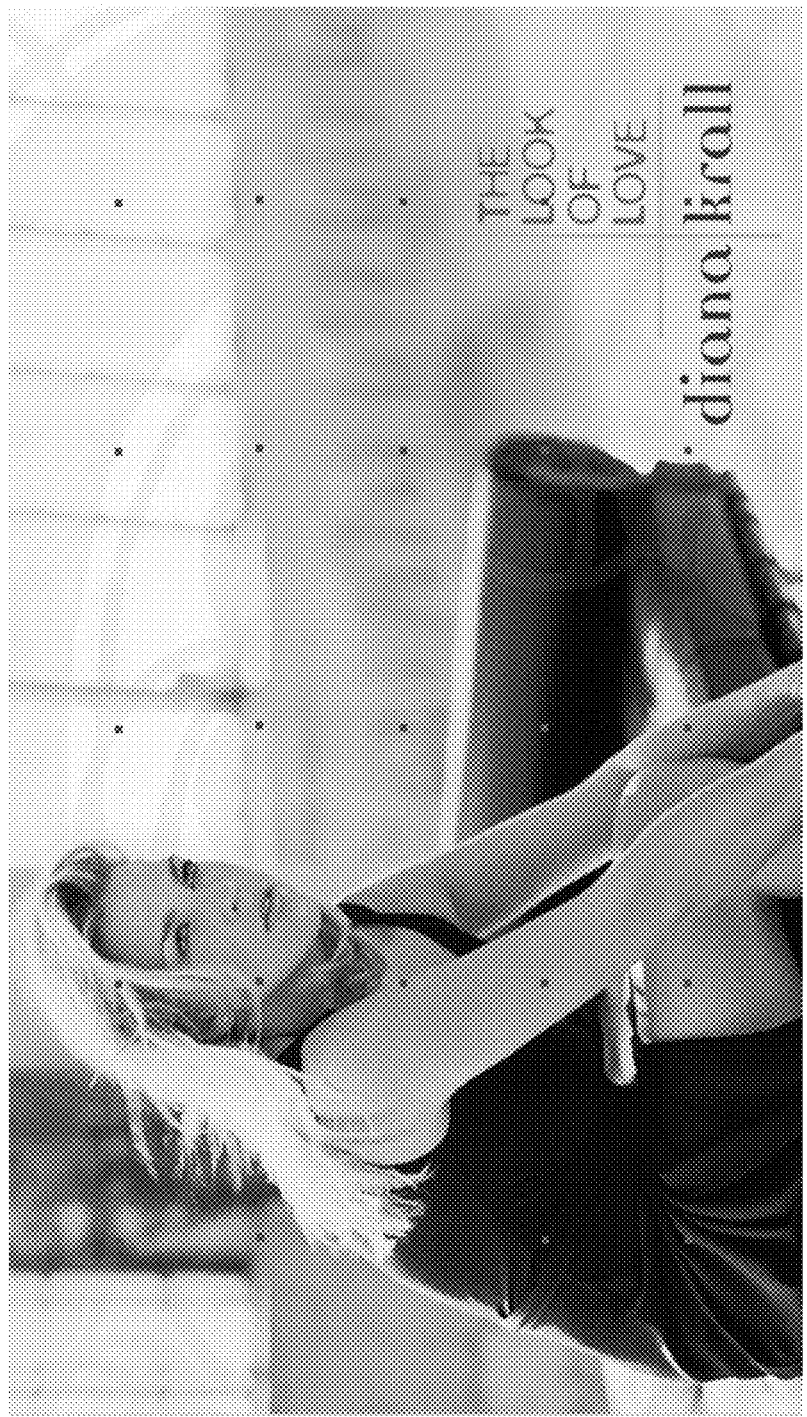
Fig 8. HDTV video frame showing exemplary pixel path locations
11x11 pixel array of 25 location watermark encoding area map

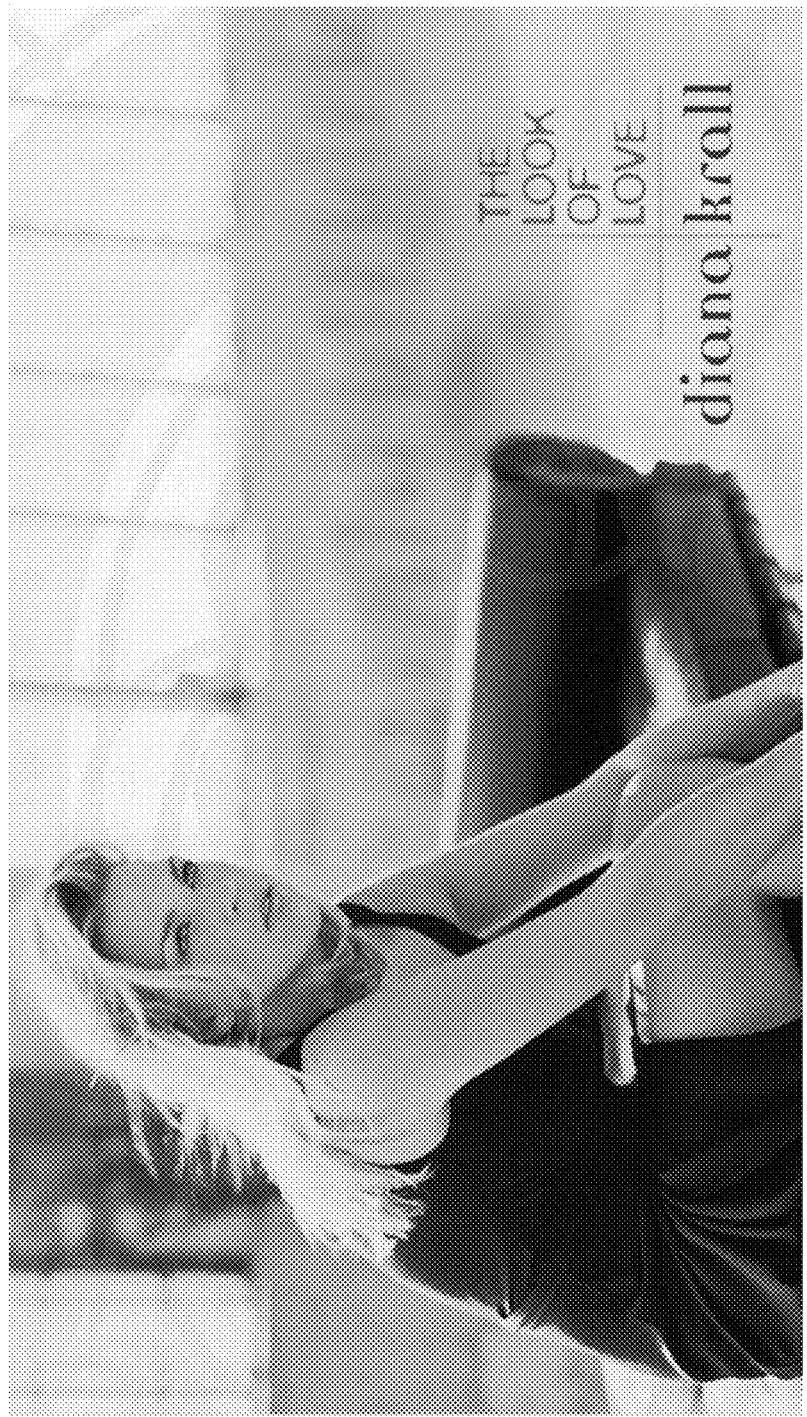
Fig 9. HDTV video frame showing exemplary watermarked pixel patches

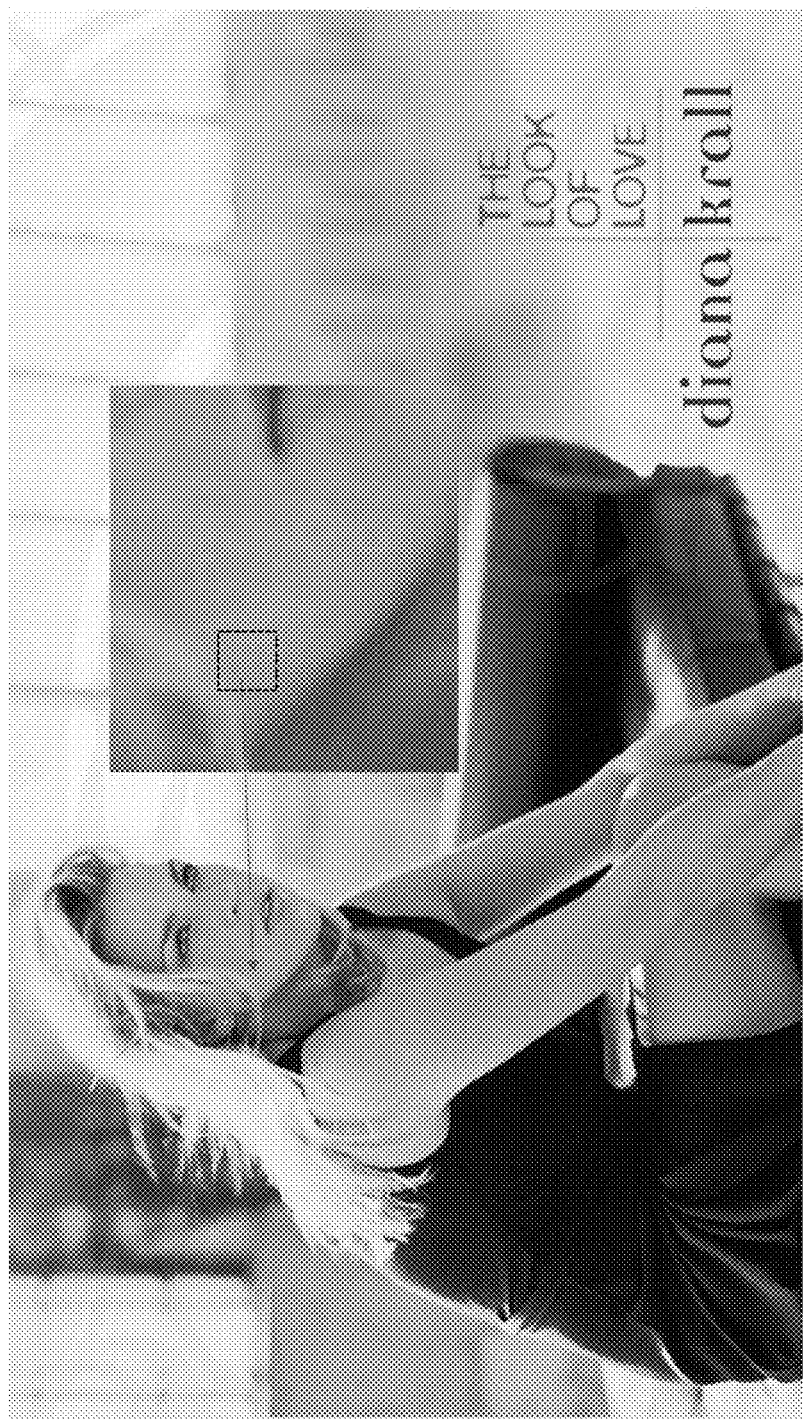
Fig 10. HDTV video frame showing closeup of watermark altered pixel path

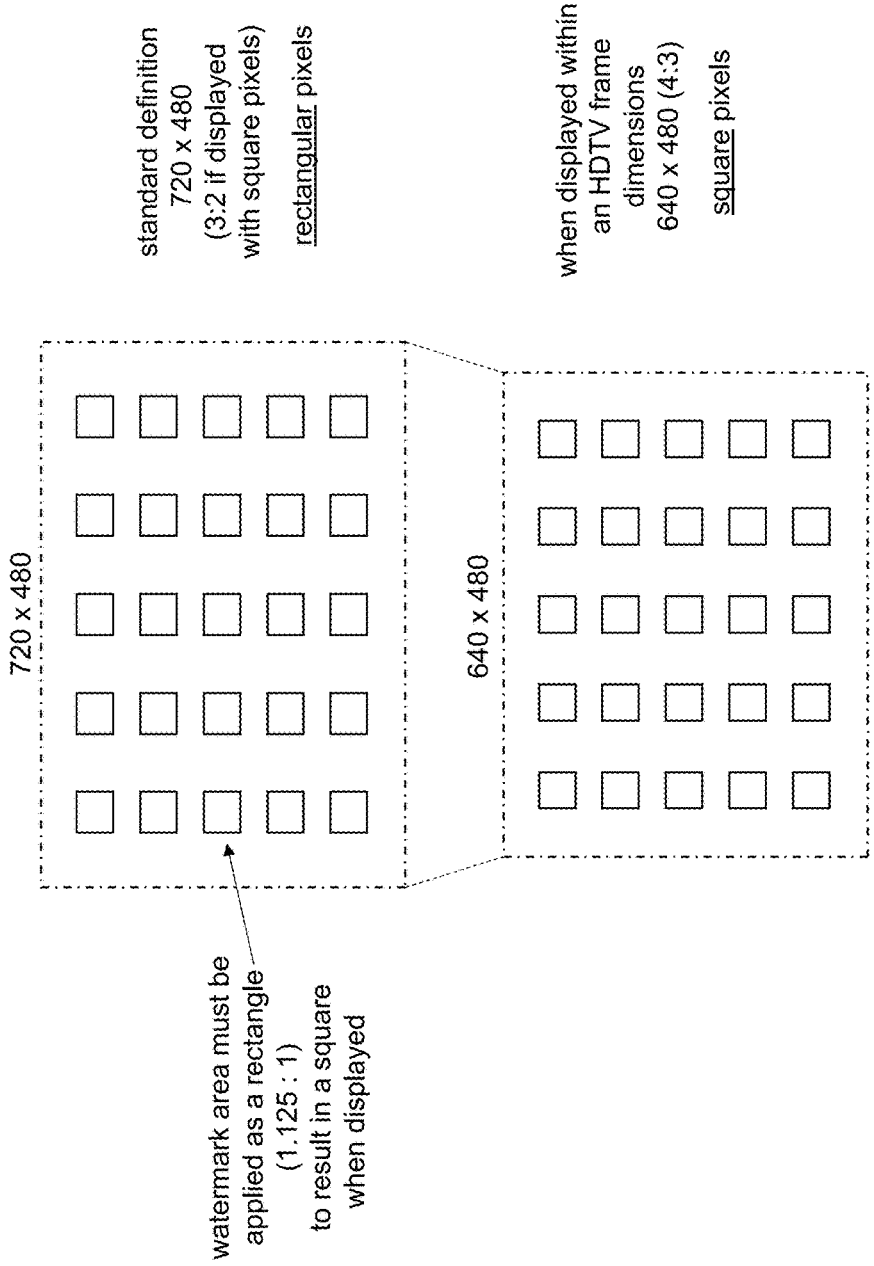
Fig 11. Standard Definition Television Pixel Dimensions

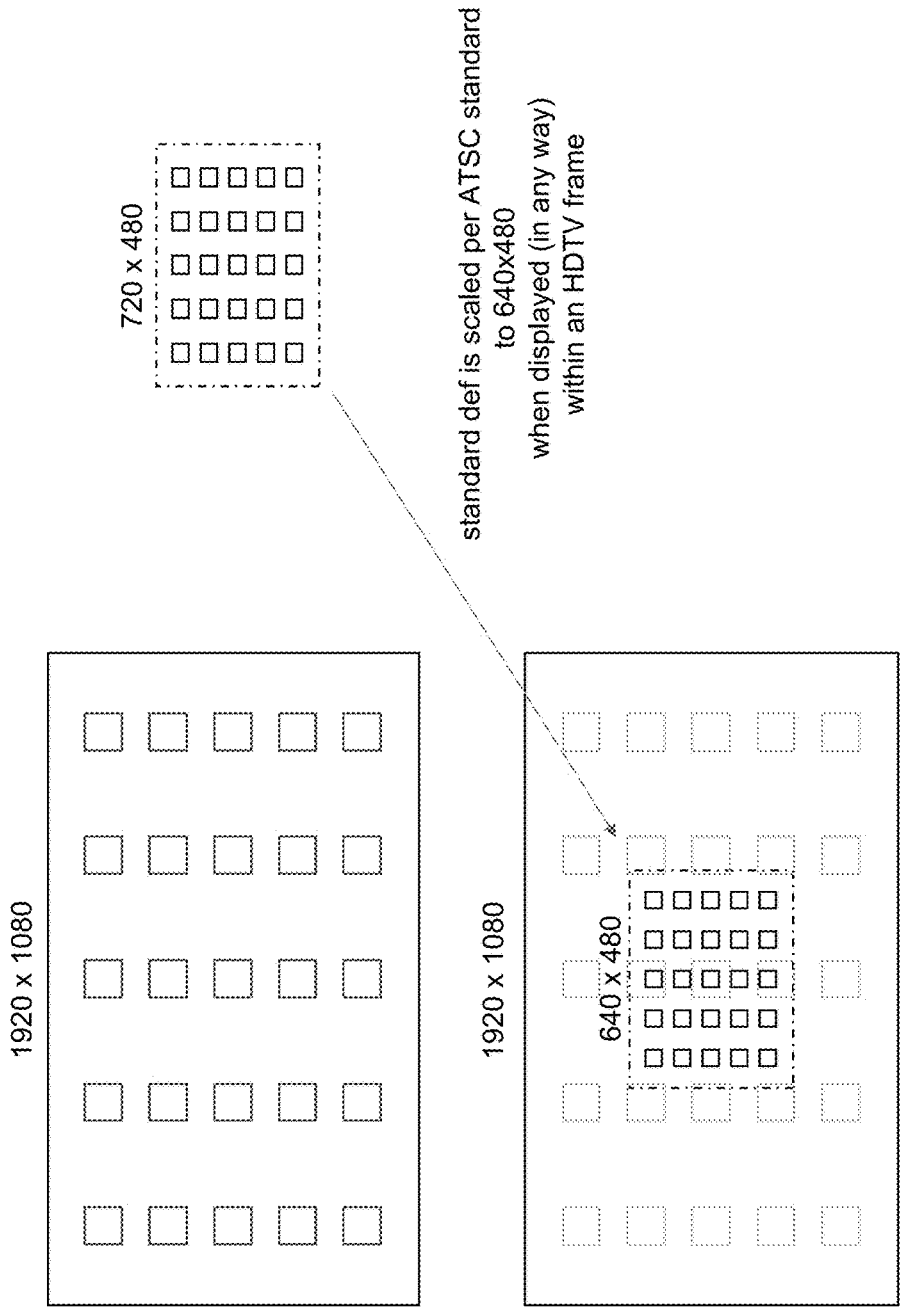
Fig 12. Standard Definition Television Pixel Dimensions Overlaid onto HDTV

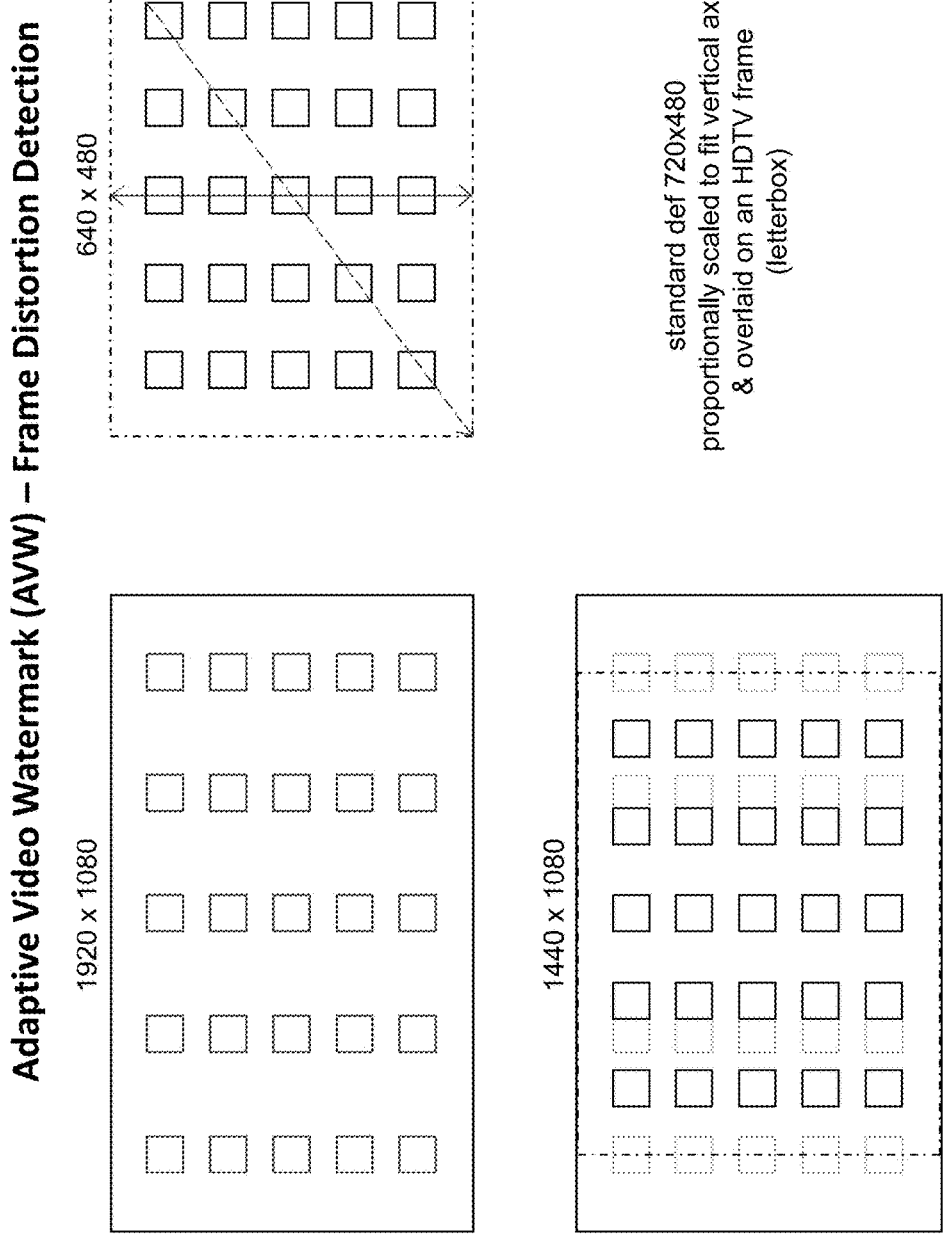
Fig 13a. Standard Definition Television Pixel Dimensions Scaled Vertically to 1080 Lines and Overlaid on HDTV

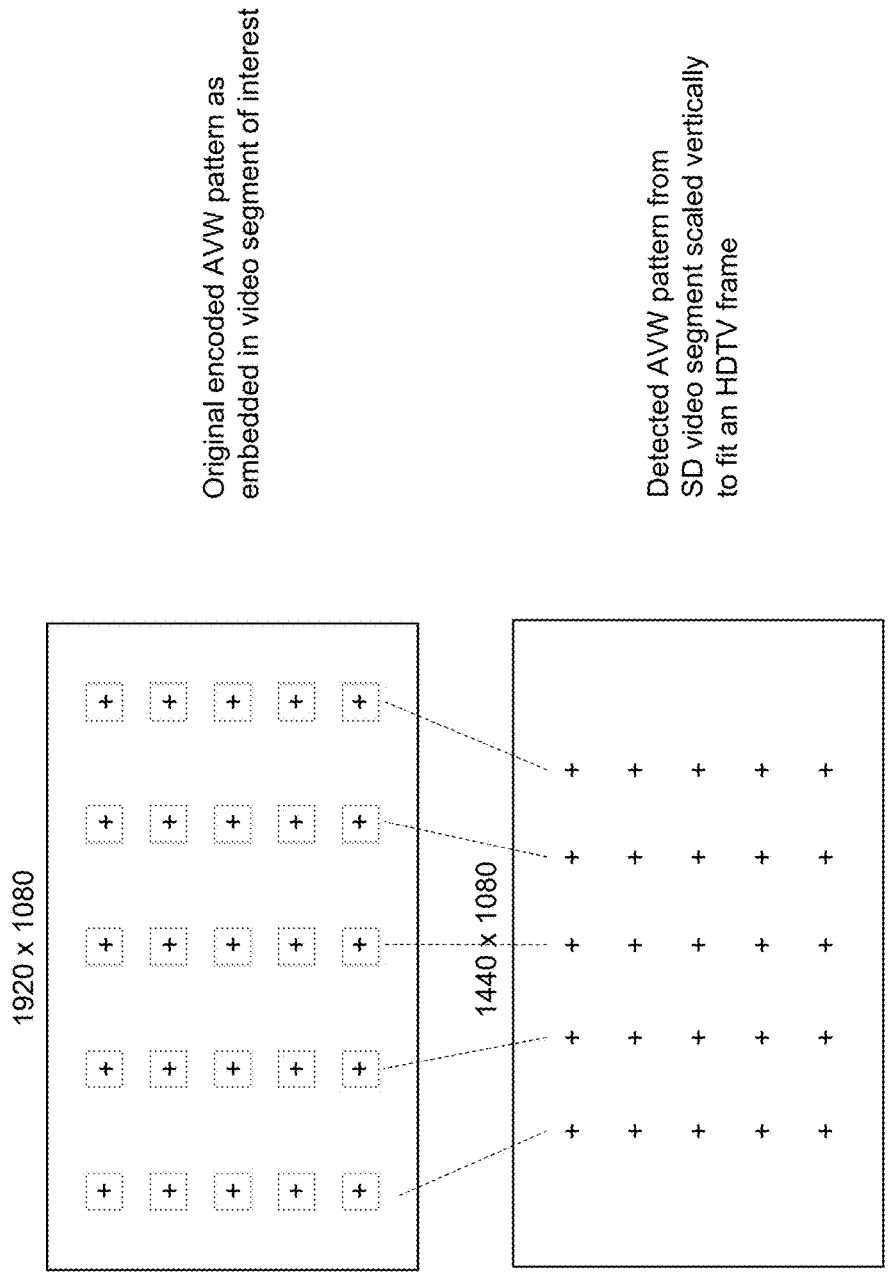
Fig 13b. Standard Definition Television Pixel Dimensions Scaled Vertically to 1080 Lines and Overlaid on HDTV

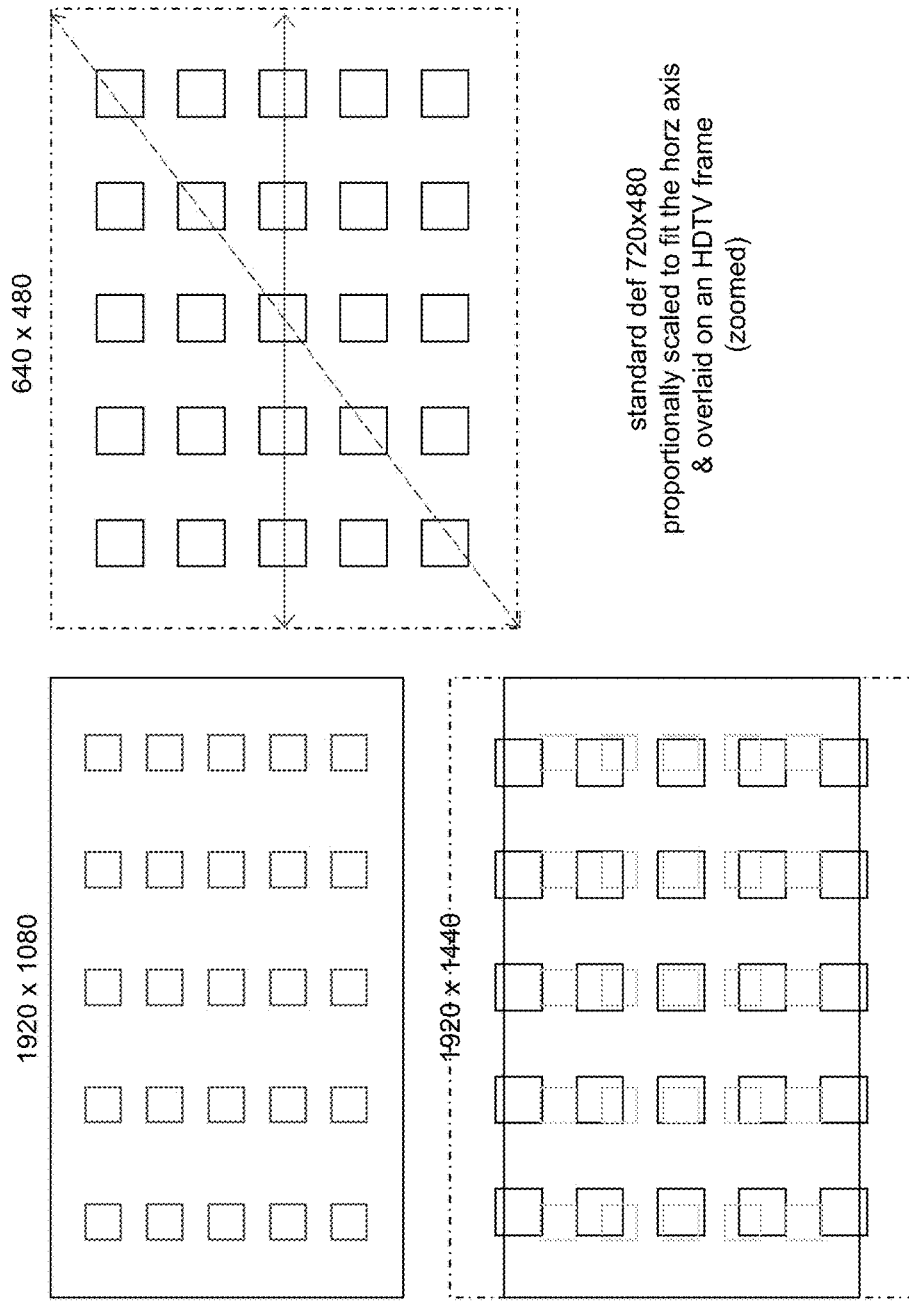
Fig. 14a. Standard Definition Television Pixel Dimensions Scaled Horizontally to 1920 Lines and Overlaid on HDTV

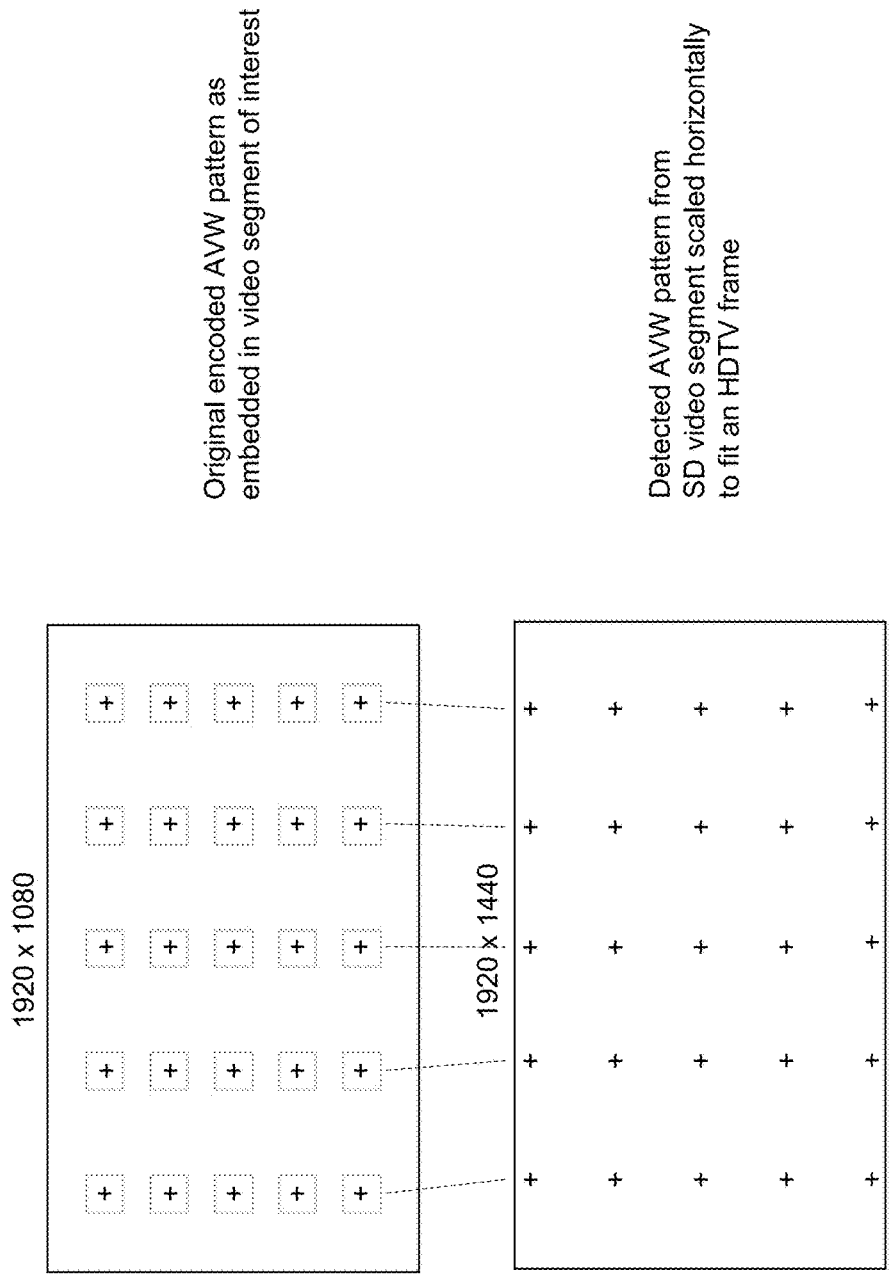
Fig 14b. Standard Definition Television Pixel Dimensions Scaled Horizontally to 1920 Lines and Overlaid on HDTV

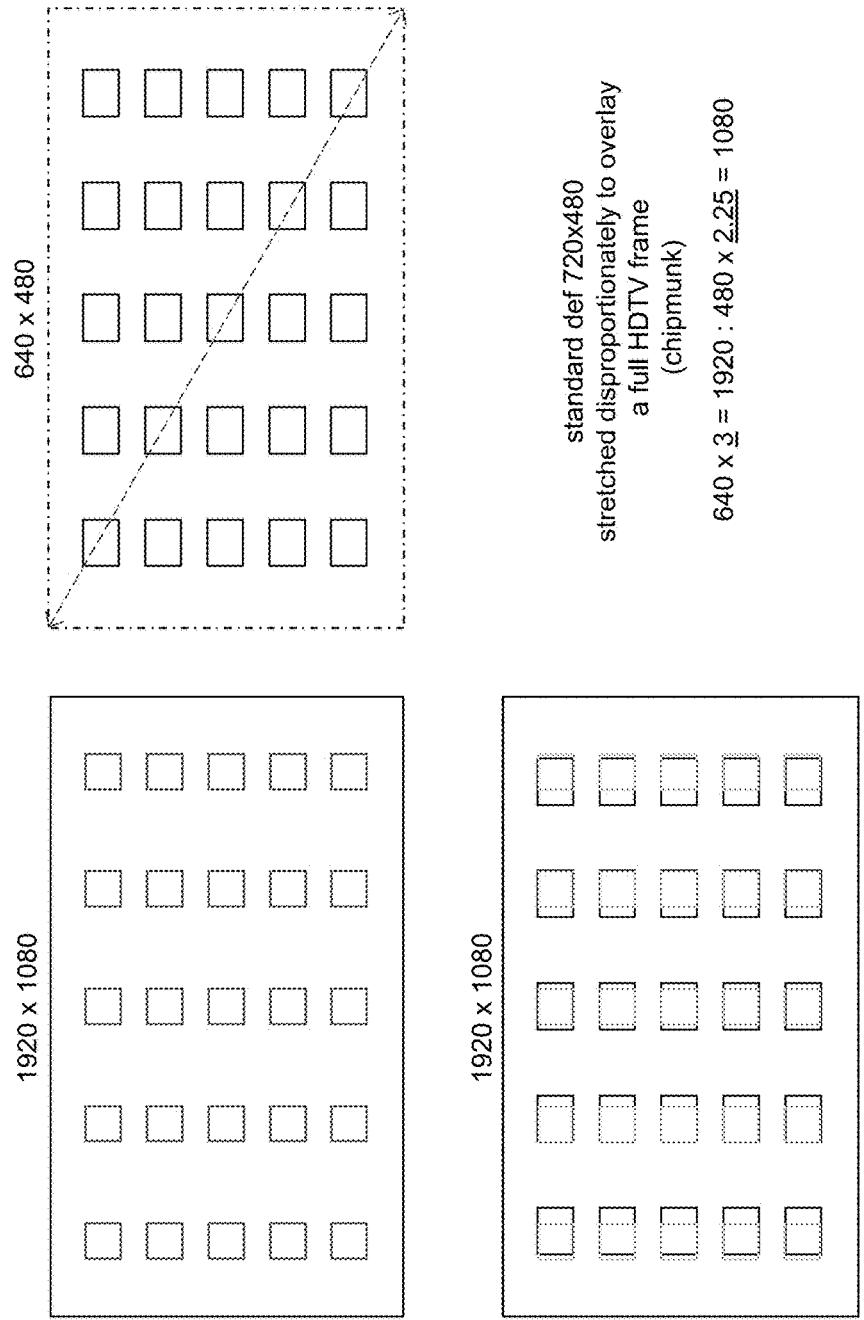
Fig 15a. Standard Definition Television Pixel Dimensions Distorted to Fit an HDTV Frame

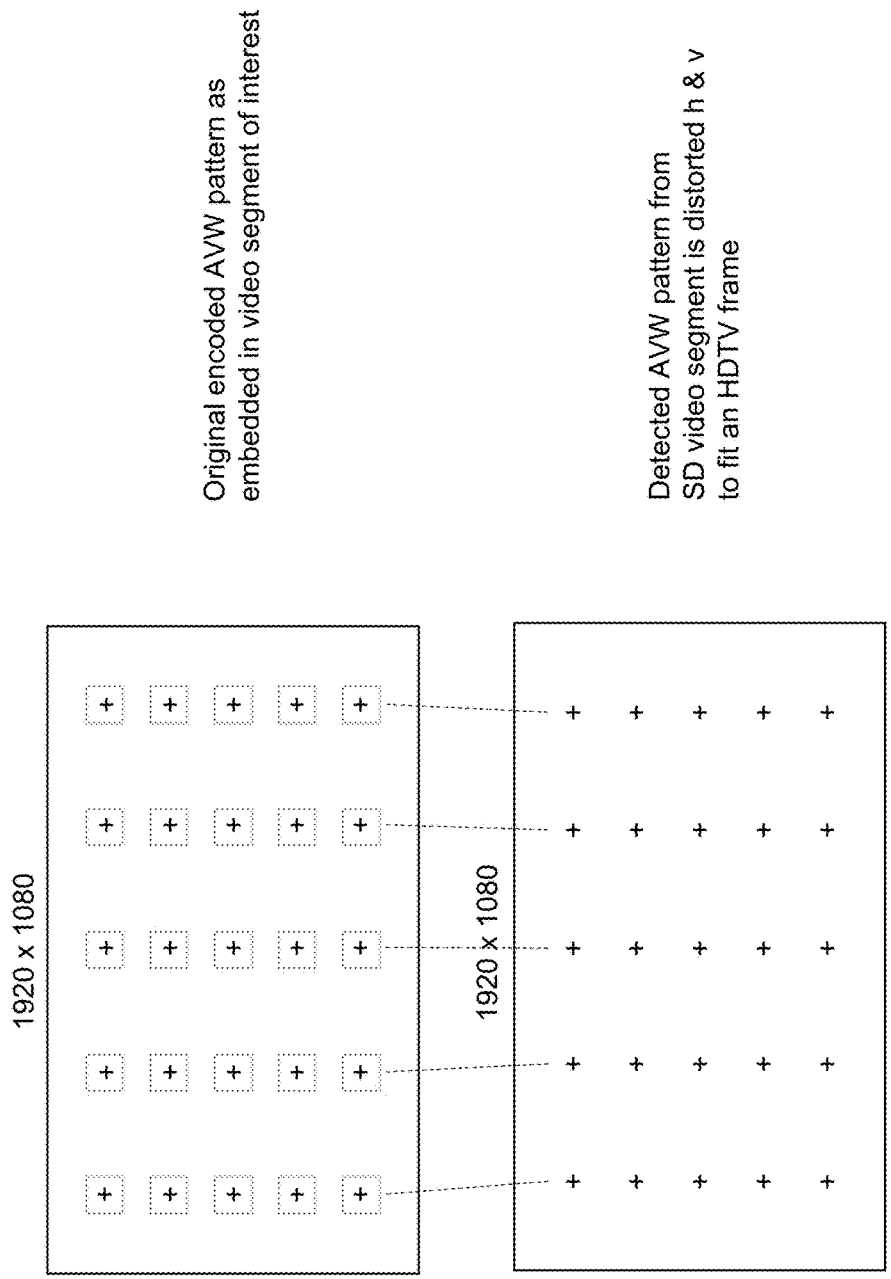
Fig 15b. Standard Definition Television Pixel Dimensions Distorted to Fit an HDTV Frame

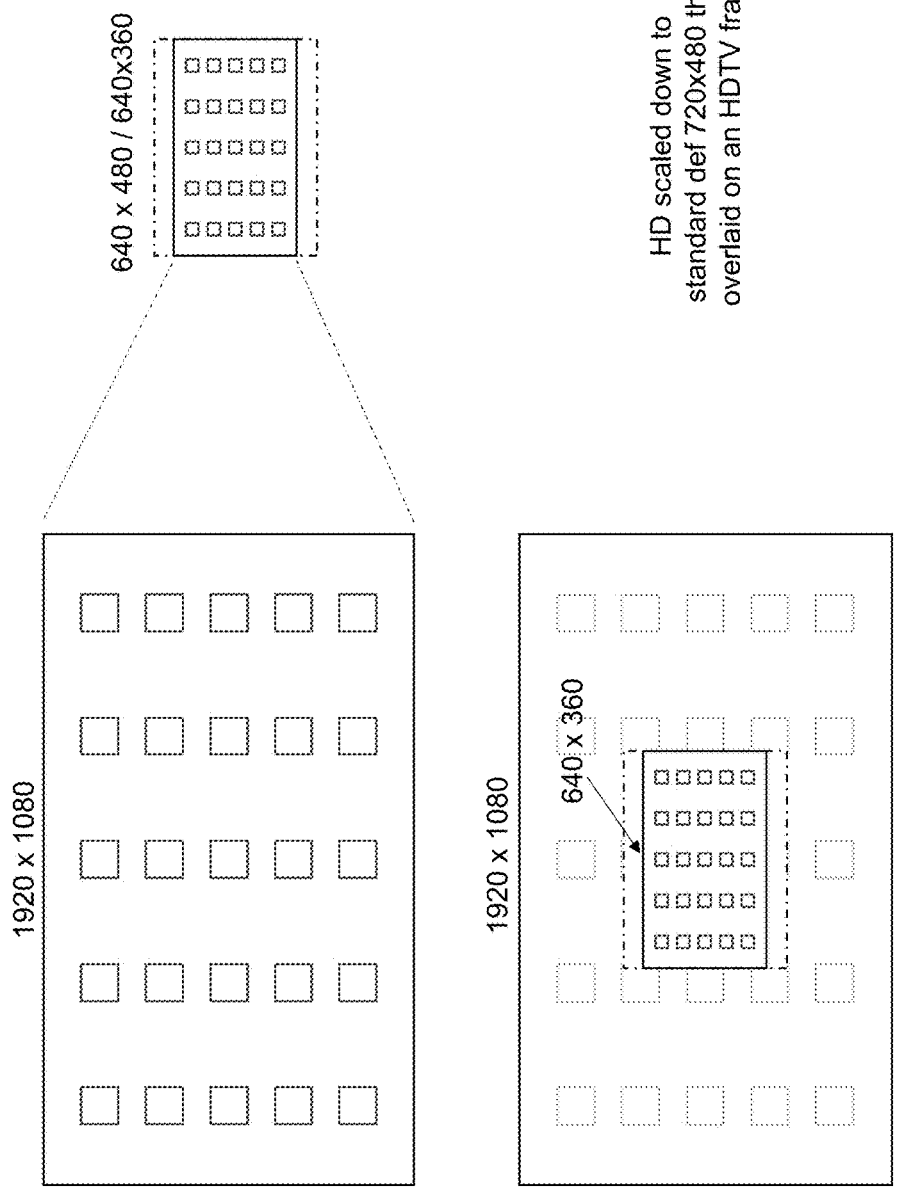
Fig 16. HDTV scaled down to standard definition then overlaid on HDTV frame

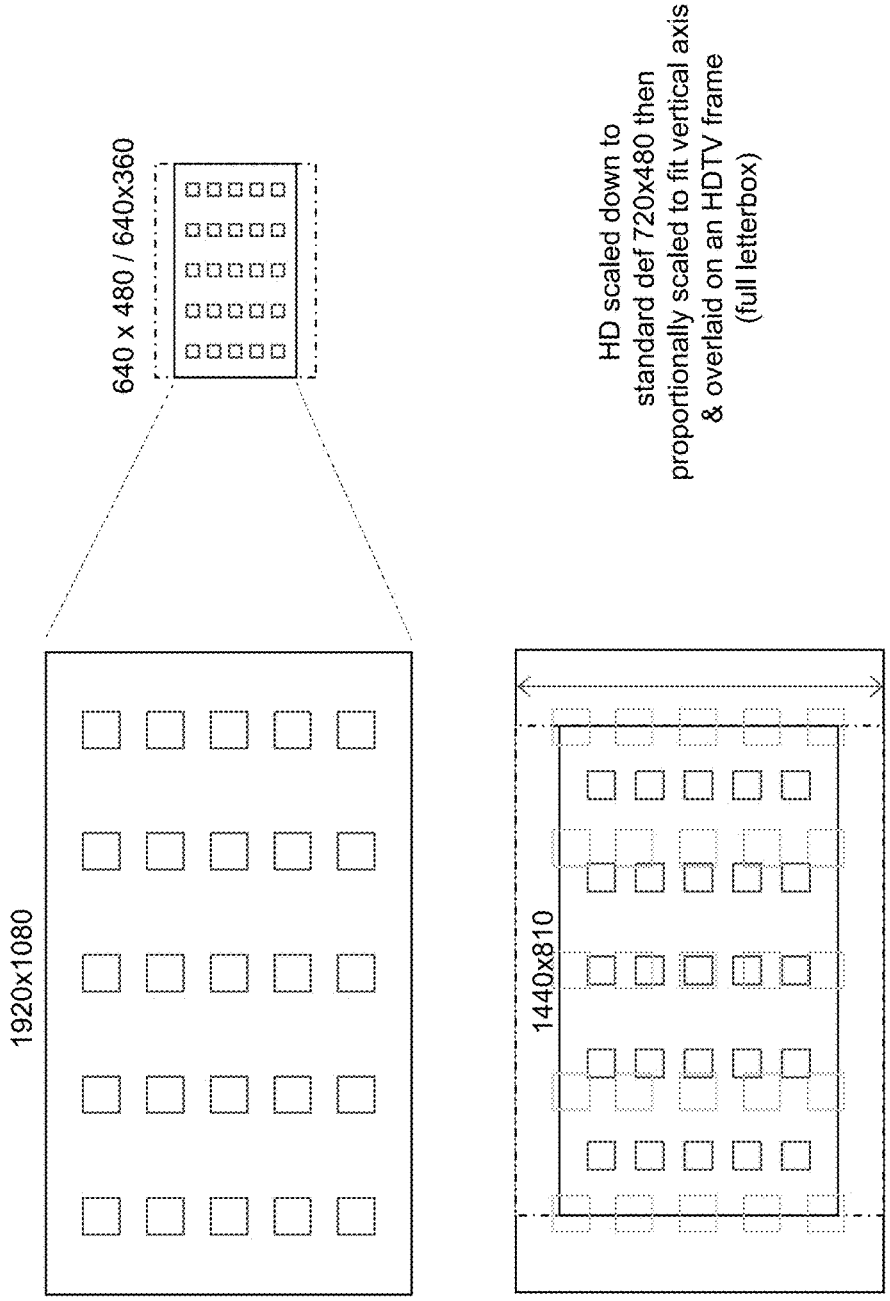

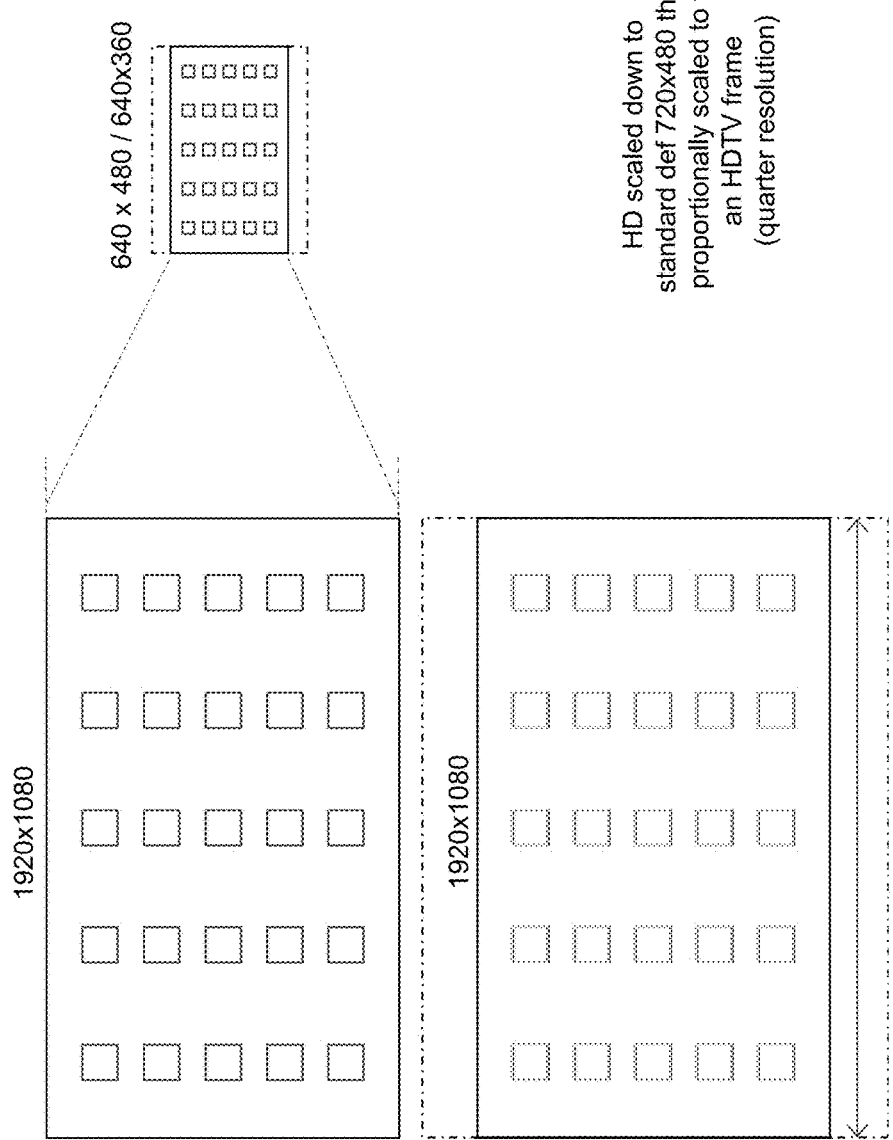
Fig 18. HDTV scaled down to standard definition then scaled horizontally and overlaid on HDTV frame

US 10,360,651 B1

COMPATIBLE ADAPTIVE VIDEO WATERMARKING

PRIORITY CLAIM

The present application is related to and/or claims the benefits of the earliest effective priority date and/or the earliest effective filing date of the below-referenced applications, each of which is hereby incorporated by reference in its entirety, to the extent such subject matter is not inconsistent herewith, as if fully set forth herein:

(1) this application constitutes a non-provisional of U.S. Provisional Patent Application No. 62/394,390, entitled COMPATIBLE ADAPTIVE VIDEO WATERMARKING, naming W. Leo Hoarty as the inventor, filed Sep. 14, 2016, which is currently or is an application of which a currently application is entitled to the benefit of the filing date.

FIELD OF THE INVENTION

This invention relates generally to video, and, more specifically, to compatible adaptive video watermarking.

BACKGROUND OF THE INVENTION

Recent advances in video technology have exposed new opportunities for solutions directed to compatible adaptive video watermarking.

SUMMARY

System of the invention embeds data as binary bits by shifting one or more color space values of a small patch of pixels. Each patch of pixels represents a single binary bit. An array of pixel patch areas is distributed across a video frame and modified per patch to encode a binary word of watermark data. Watermarked pixel patches are cloaked by shifting a color space value of a respective pixel patch area that is the least noticeable to human visual perception.

Only the center cluster of pixels (typically 5×5 area within a patch area of 11×11 is modified). Color space value to shift per pixel patch is determined by surrounding pixels to produce the least noticeable change to human visual perception.

In another embodiment, pixel patches that are modified can be shifted in x, y position within the pixel patch area in the next video frame in a pseudo-random orbit to reduce visibility. Data words fill a video frame (from 8 to 32 bits) and can be encoded using redundancy such as repeating data word in subsequent frames as well as Gray coding (reflected binary coding) to detect errors during decoding. Encoded watermark will survive multiple re-encodings.

Informative Definitions:
Many color space definitions exist to map color space:
   RBG, HSL, HSV and several variations:
HSL (L=lightness or luminosity)=HSI (I=intensity)
HSV (V=value)=HSB (B=brightness)
Around the circle is Hue where Red=0 degree, Green=120 degrees, Blue=240 degrees
Central vertical axis comprises achromatic (gray) from black at bottom to white at top
Color Saturation is zero at the vertical axis and increases to 100% at the circumference
HSL maps to RGB and vice versa The foregoing is a summary and thus contains, by necessity, simplifications, generalizations and omissions of detail; consequently, those skilled in the art will appreciate that the summary is illustrative only and is not intended to be in any way limiting. Other aspects, embodiments, features and advantages of the device and/or processes and/or other subject matter described herein will become apparent in the teachings set forth herein.

BRIEF DESCRIPTION OF THE DRAWINGS

Certain embodiments of the present invention are described in detail below with reference to the following drawings:

FIG. 1 depicts an HDTV display area showing 32 pixel patch locations.

FIG. 2 depicts a pixel patch area of 11×11 pixels.

FIG. 3 depicts color space graphs of HSL and RGB color space.

FIG. 4 depicts data block pseudo-random motion around a pixel patch.

FIG. 5 depicts data repetition by frame grouping.

FIG. 6 depicts an encoding flow diagram.

FIG. 7 depicts a de-encoding flow diagram.

FIG. 8 depicts an HDTV video frame showing exemplary pixel path locations.

FIG. 9 depicts an HDTV video frame showing exemplary watermarked pixel patches.

FIG. 10 depicts an HDTV video frame showing a closeup of a watermark altered pixel path.

FIG. 11 depicts standard definition television pixel dimensions.

FIG. 12 depicts standard definition television pixel dimensions overlaid onto HDTV.

FIG. 13a depicts standard definition television pixel dimensions scaled vertically to 1080 lines and overlaid on HDTV.

FIG. 13b depicts standard definition television pixel dimensions scaled vertically to 1080 lines and overlaid on HDTV.

FIG. 14a depicts standard definition television pixel dimensions scaled horizontally to 1920 lines and overlaid on HDTV.

FIG. 14b depicts standard definition television pixel dimensions scaled horizontally to 1920 lines and overlaid on HDTV.

FIG. 15a depicts standard definition television pixel dimensions distorted to fit an HDTV frame.

FIG. 15b depicts standard definition television pixel dimensions distorted to fit an HDTV frame.

FIG. 16 depicts HDTV scaled down to standard definition then overlaid on HDTV frame.

FIG. 17 depicts HDTV scaled down to standard definition then scaled vertically and overlaid on HDTV frame.

FIG. 18 depicts HDTV scaled down to standard definition then scaled horizontally and overlaid on HDTV frame.

DETAILED DESCRIPTION

Specific details of certain embodiments of the invention are set forth in the following description and in the figures to provide a thorough understanding of such embodiments. The present invention may have additional embodiments, may be practiced without one or more of the details described for any particular described embodiment, or may have any detail described for one particular embodiment practiced with any other detail described for another embodiment.

Importantly, a grouping of inventive aspects in any particular "embodiment" within this detailed description, and/ or a grouping of limitations in the claims presented herein, is not intended to be a limiting disclosure of those particular aspects and/or limitations to that particular embodiment and/or claim. The inventive entity presenting this disclosure fully intends that any disclosed aspect of any embodiment in the detailed description and/or any claim limitation ever presented relative to the instant disclosure and/or any continuing application claiming priority from the instant application (e.g. continuation, continuation-in-part, and/or divisional applications) may be practiced with any other disclosed aspect of any embodiment in the detailed description and/or any claim limitation. Claimed combinations which draw from different embodiments and/or originally-presented claims are fully within the possession of the inventive entity at the time the instant disclosure is being filed. Any future claim comprising any combination of limitations, each such limitation being herein disclosed and therefore having support in the original claims or in the specification as originally filed (or that of any continuing application claiming priority from the instant application), is possessed by the inventive entity at present irrespective of whether such combination is described in the instant specification because all such combinations are viewed by the inventive entity as currently operable without undue experimentation given the disclosure herein and therefore that any such future claim would not represent new matter.

FIG. 1 depicts an HDTV display area showing 32 pixel patch locations, and

FIG. 2 depicts a pixel patch area of 11×11 pixels, the foregoing depictions showing a possible environment in which an Adaptive Video Watermark (AVW) Embedding Process such as that summarized in FIG. 2 may be employed.

FIG. 3 depicts color space graphs of HSL and RGB color space in which the following Normative Definitions will apply:

Color space manipulations encode data usually as binary bits
  Operations are calculated as offsets in the Hue, Saturation and Lightness color space (HSL)
  HSL are transformed to RGB to apply to video frame buffer
  A binary one is encoded by shifting one or more axes of HSL relative to surrounding pixels within pixel sample area
  Said shift of designated HSL parameter is opposite previous frame when possible for encoding of a binary one for the same pixel patch position when surrounding conditions to shifted pixels are the same or equivalent FIG. 4 depicts data block pseudo-random motion around a pixel patch in which encoding is concealed from human visual perception due to the following observed traits of Human eye sensitivity:

most sensitive to mid-value luminance changes;
  least sensitive to color saturation changes;
  moderately sensitive to hue changes at high saturation
  decreasing sensitivity to hue changes with decreasing saturation FIG. 5 depicts data repetition by frame grouping, including an example of repeat data for multiple frames, the analysis of which may be a portion of an encoding flow diagrammed in FIG. 6 specifying in part the following Encoding Rules of the Invention (a de-encoding of which being depicted in FIG. 7):

An array of a multiplicity of ten-by-ten grids of pixels per video frame (such as the exemplary locations depicted in FIG. 8) is employed to form the watermark mask:
  Encode a binary one by modifying a 4×4 array of pixels within the 10×10 pixel block
  Encode pixel block by changing the value of either Hue or Saturation or Lightness
  A combination of more than one of HSL can be used to encode a binary one when required
  Decision to shift value of either H, S or L is based on values of surrounding pixels
  Encoding a binary one when:
  Saturation <20% & Luminance<70%; L=L+/−20%
  Sat <20% & Luminance=>70%; L=L−20%
  Saturation=>10%<30%, H=H+/−40%
  Saturation >70%, S=S−30%
  Saturation >30%<70%; S=+/−30%
  Rule base will be extended and/or amended by empirical evaluation
  Once a value is calculated for H, S and/or L offset, all of the pixels of 2*b* are paint with the same value (within area 2*b*)
  When a binary one is encoded and pixels are shifted has shown, for example by the example watermarked video frame of FIG. 9, and the highlighted example shown in FIG. 10), the direction of shift will be in the opposite respective HSL direction of the previous shift (if any) of the same pixel block position of the previous frame.
  Active pixel blocks will move spatially (x, y) within the sampling block (e.g.—within 11×11 array) on a frame by frame cadence (or less)
  Motion of pixel block will be determined by a pseudo-random sequence from a seed value
  Error detection code capable of correcting 'n' bits applied to frame
  Frames may contain sequence number to link frames to larger data set
  Frames may contain repeated sequence number and data for error correction by averaging multiple frames (e.g.—3 frames repeated, data bit=majority of three values at respective location)
  Encoding Rules for Compressed Video (MPEG and H.264/5)
  Operations performed on a multiplicity of DCT blocks
  Values are modified in Y, U, V space
  Y approximates Luminance
  U, V translate through R,G,B to Hue and Saturation
  One DCT block is modified and four neighboring blocks are used as reference
  Similar rules apply to color space manipulation to represent data as to unencoded (bitmapped) video frame at any I frame
  An I macro-block can be formed at any respective location in a B or P frame by processing the most recent I frame with intermediate values to represent instantaneous I macro block
  Pixel block are is read from video frame as 11×11 array
  System of the invention measures HSL values of outer 3 pixel perimeter and compares to HSL values of 2*b* (data area)
  Data area is measured against perimeter above and below as well as against perimeter left and right of 2*b* (data area)
  A measurable shift in H, S and/or L against horizontal and vertical axis tests is a positive sign of data value one.
  A measurable shift in the above against only one axis is scored as a probable sign of data value one
  No measurable shift in both H and V axis test is positive sign of data value zero No measurable shift in one of H or V axis test is possible sign of zero value An Application of Adaptive Video Watermarking Using Video Watermarking to Detect Aspect Ratio Distortion FIGS. 11, 12, 13*a*, 13*b*, 14*a*, 14*b*, 15*a*, 15*b*, 16, 17, and 18 depict standard television pixel dimensions, frame distortion associated with SD in various HDTV scaling schemes, and corresponding frame distortion detections using adaptive video watermarks.

Using Adaptive Video Watermark (AVW) to Detect Video Frame Distortion—Basic Principles:

A watermark with a regular pattern is imposed on a video segment in said segments original dimensions such as: Feature Film, HDTV, or Standard Definition (SD) frame size.

Said video segment is then processed to pass through an MVPD or Internet Video Provider network.

Said video networks sometimes scale said video segments to smaller dimensions, for instance, from HDTV to SD.

Furthermore, some consumers adjust their television receivers to scale said reduced dimension video to a larger size in order to fill the TV screen with the image.

Said scaling introduces certain pixel distortions and, whether scaled by the consumer or simply viewed as transmitted, will cause the received image on the consumers TV display to not match the original video segment as delivered by the content owner to the distribution system.

Said mismatch of original video segment to said segment as displayed in the home can cause an automated content recognition to fail to identify said video segment.

Hence, it is the purpose of this invention to provide the means to determine the frame distortion that has occurred to the video segment due to any manipulation in the transmission path from the original source to the display in the consumer's home.

Once the frame distortion is determined, the ACR pixel samples can be likewise manipulated to allow video segment identification to accurately resume.

An array of pixel patch areas is distributed across a video frame and modified per patch to encode a binary word of watermark data System embeds data as binary bits by shifting a color space value of a small patch of pixels Watermarked pixel patches are encoded into known video frame locations Detection of watermark is performed by testing all pixel locations in a video frame FIGS. 13*b*, 14*b*, and 15*b* illustrate exemplary pixels shifts as a result of the respective video frame distortion.

Analysis of the video frame pixel coordinates of watermark locations provides a template to determine which video frame distortion As noted above, FIGS. 11, 12, 13*a*, 13*b*, 14*a*, 14*b*, 15*a*, 15*b*, 16, 17, and 18 illustrate an exemplary set of the various image frame distortions typical in contemporary television systems.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of this subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.).

While preferred and alternative embodiments of the invention have been illustrated and described, as noted above, many changes can be made without departing from the spirit and scope of the invention. Accordingly, the scope of the invention is not limited by the disclosure of these preferred and alternate embodiments. Instead, the invention should be determined entirely by reference to the claims that follow.

What is claimed is:

1. A system, comprising:
   at least one processing device; and
   one or more instructions which, when executed by the at least one processing device, configured the at least one processing device to perform one or more operations including at least:
   forming a watermark mask, the watermark mask formed at least partially based on at least one ten-by-ten grid of pixels selected from a video frame, including at least selecting a four-by-four array of pixels within the at least one ten-by-ten grid of pixels selected from the video frame;
   modifying the four-by-four array of pixels to encode a binary "one" represented by a modified four-by-four array of pixels, including at least:
   deciding to shift at least one of an h value, an s value, or an l value of at least one pixel of the at least one ten-by-ten grid of pixels at least partially based on one or more values of one or more surrounding pixels around the at least one pixel; and painting one or more pixels within the four-by-four array of pixels to represent the binary "one" at least partially based on at least one shifted value to form the watermark mask; and determining motion occurring between the selected video frame and at least one adjacent frame at least partially based on the watermark mask including at least the binary "one" associated with the selected video frame and at least partially based on a corresponding at least one ten-by-ten grid of pixels selected from the at least one adjacent frame.

* * * * *